United States Patent

Dulog et al.

[11] 3,910,905
[45] Oct. 7, 1975

[54] PHOSPHORUS DERIVATIVES OF 1,2,4,5-TETRAHYDROXY BENZENE

[75] Inventors: Lothar G. Dulog, Sint Martens Latem; Sylvain A. R. Dewaele, Evergem, both of Belgium

[73] Assignee: s.a. Texaco Belgium n.v., Brussels, Belgium

[22] Filed: Jan. 7, 1974

[21] Appl. No.: 431,250

Related U.S. Application Data

[62] Division of Ser. No. 250,712, May 5, 1972, Pat. No. 3,819,748.

[52] U.S. Cl.... 260/246 B; 260/293.62; 260/293.58; 260/326.5 A; 260/326.61; 260/927 R; 260/984; 260/985; 260/986; 252/49.9
[51] Int. Cl.² ............................... C07D 295/16
[58] Field of Search.... 260/246 B, 293.62, 326.5 A, 260/326.61

[56] References Cited
UNITED STATES PATENTS
3,819,748  5/1974  Dulog et al. ............ 260/927 R

*Primary Examiner*—Donald G. Daus
*Assistant Examiner*—Jose Tovar
*Attorney, Agent, or Firm*—Thomas H. Whaley; Carl G. Ries

[57] ABSTRACT

Disclosed are benzobisphospholes of the formula:

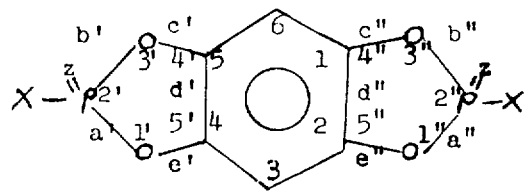

wherein:

X represents halogen, $NR_2$ where R is hydrogen, alkyl, or cycloalkyl, having up to 30 carbon atoms or aryl or aralkyl having up to 22 carbon atoms, pyrrolidino, piperidino or morpholino; Z is oxygen or sulfur or may be absent.

These compounds are effective as anti-wear and anti-oxidant additives for lubricating oils. They also have flame retardant properties.

3 Claims, No Drawings

PHOSPHORUS DERIVATIVES OF 1,2,4,5-TETRAHYDROXY BENZENE

CROSS-REFERENCE TO CO-PENDING APPLICATION

This application is a division of coassigned patent application Ser. No. 250,712, filed May 5, 1972, now U.S. Pat. No. 3,819,748, issued June 25, 1974.

The present invention relates to compositions of matter classified in the art of chemistry as phosphorus derivatives of tetrafunctional aromatic compounds, to uses thereof and to methods of synthesizing the same. These compounds are (1,2d' − 4, 5d'')-benzobis-(1,3,2-dioxaphospholes) and have the formula:

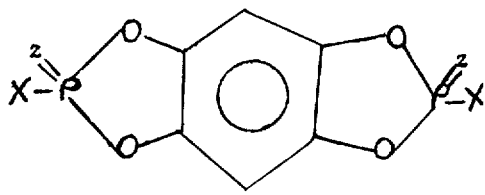

wherein:

X represents halogen, NR, where R is hydrogen, alkyl, or cycloalkyl, having up to 30 carbon atom or aryl or aralkyl having up to 22 carbon atoms, pyrrolidino, piperidino or morpholino; Z is oxygen or sulfur or may be absent.

These compounds are effective as anti-wear and anti-oxidant additives for lubricating oils. They also have flame retardant properties.

The starting material for preparing these compounds is 1,2,4,5-tetrahydroxybenzene, a practical synthesis of which is described in commonly assigned patent application Ser. No. 92,139, filed Nov. 23, 1970, now U.S. Pat. No. 3,780,114.

The compounds of the invention can be prepared by reacting 1,2,4,5-tetrahydroxybenzene (THB,I) by a series of reactions which may be summarized as follows:

When THB (I) is heated with a large excess of $PCl_3$ and a small amount of water, the bischloridite (II) is obtained in 78–84 percent yield. The pure THB (I) can be replaced by the mixed crystals of THB (I) and tetrahydrofuran (THF), described in U.S. Pat. application Ser. No. 92,139, filed on Nov. 23, 1970, now U.S. Pat. No. 3,780,114, giving II in 85 percent yield. The details are given in Examples 1 and 2. Table I contains several examples of runs. The bischloridite II can be converted into amides as shown below.

The reaction of THB (I) with $POCl_3$ does not afford the expected bischloridate (IV). Therefore, IV was prepared in two other ways. First, the bischloridito II can be chlorinated in $CCl_4$ giving a solution of III and secondly, THB (I) can be converted into III by reaction with $PCl_5$ in $CCl_4$. When the solution of III is treated with acetone at room temperature, the bischloridate (IV) is obtained as an insoluble material. The overall yield by the transformations THB (I) − II − III − IV is 76.5 percent and by the sequence THB (I) − III − IV it is 54–69 percent. Both methods are described in Examples 4 and 5. Tables II and III (Examples 6 and 7) contain data of individual runs. The bischloridate (IV) can be converted into amides (see below).

Also the bisthiochloridate V cannot be prepared directly from THB (I) and $PSCl_3$ because the two compounds do not, unexpectedly, react with each other. Therefore it was necessary to use the bischloridite (II) as a starting material for its preparation. A procedure was elaborated whereby the bischloridite (II) is treated with an excess of $PSCl_3$ and a catalytic amount of $Et_3N$. By this way, the bisthiochloridate (V) is obtained in an 82–88 percent yield. See also Example 8 and Table IV (Example 9). The overall yield for the conversion THB (I) − II − V in this way is 64–75 percent. The bisthiochloridate V has been converted into amides (see below).

The preparations of the amides derived from the bischlorides, II, IV and V are summarized in Tables V (Example 10), VI (Example 11) and VII (Example 12), respectively. Generally these amides (VI, Z=O,S or absent) are prepared by reaction of the acid chloride (II, IV or V) with four equivalents

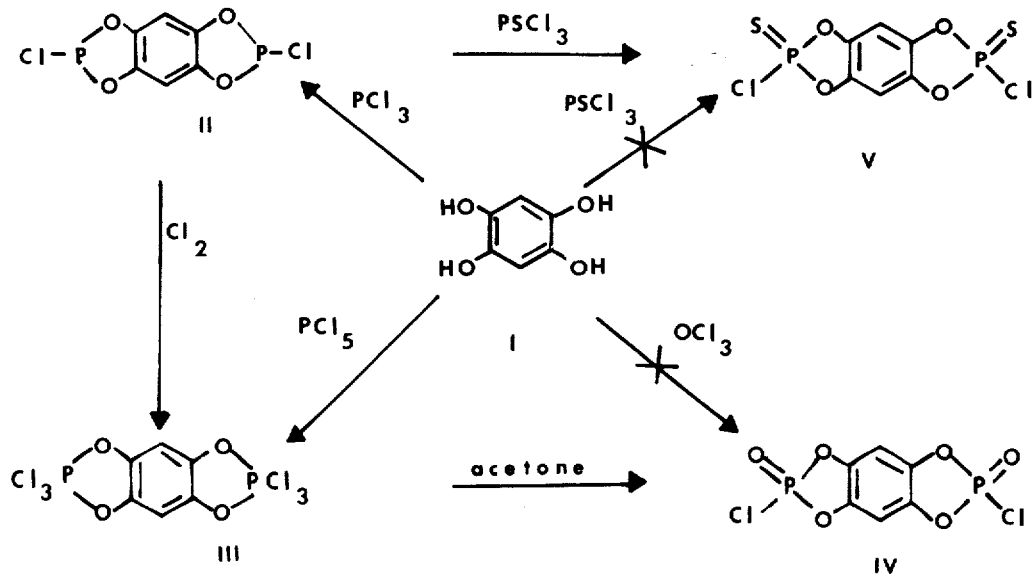

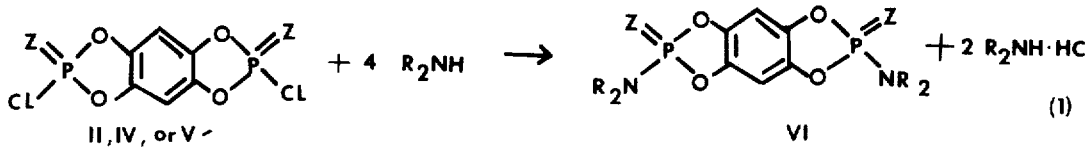

of a primary or a secondary amine R₂NH in an inert solvent (like ether, benzene or mixtures thereof) at room temperature (Method A) (reaction 1). Half of the amine R₂NH can be replaced by a tertiary amine like triethylamine, Et₃N or pyridine (Method B). After mixing of the reagents, a precipitate of the amine hydrochloride R₂NH—HCl (or Et₃N—HCl or pyridine hydrochloride) is formed and the amide (VI) remains in solution. The amine hydrochloride is filtered off and the product VI can be isolated by evaporation of the solvent. The yields of the crude products vary between 45 and 100 percent for the bisamidites (VI, Z is absent) Table V (Example 10) between 62 and 94 percent for the bisamidates (VI, Z=O) Table II (Example 11) and between 19 and 100 percent for the bisthioamidates (VI, Z=S) Table VII (Example 12). The bisthioamidates (VI, Z=S) also were obtained by heating a bisamidite (VI, Z is absent) with sulfur at 150°C (equation 2).

let, sealed stirrer and a reflux condenser, provided with a CaCl₂ tube, were placed 69.5 g THB (I)-THF crystals, 1.2 g (0.07 mole) H₂O and 300 ml (471 g, 3.42 moles) freshly distilled PCl₃. Stirring and heating were started. The THB (I)-THF crystals dissolved after about 30 minutes. Refluxing of the mixture was continued for 16 hours, whereafter HCl evolution stopped. The solution contained a white haziness.

To the hot mixture was added a few drops to 1 ml of Et₃N or pyridine after which it was refluxed for a few more minutes until the haziness coagulated to an oily precipitate. The liquid was decanted from the precipitate and allowed to cool. The bischloridite (II, 32.6 g) was obtained as white crystals of mp 118°–124°C. A second crop (20.6 g) was obtained after reducing the amount of PCl₃ to half of its original value. A third crop (3.3 g) was obtained in the same way, giving a total yield of 56.5 g (85.2 percent)[1].

[1] The yield was calculated for crystals with a THF content of 50 percent.

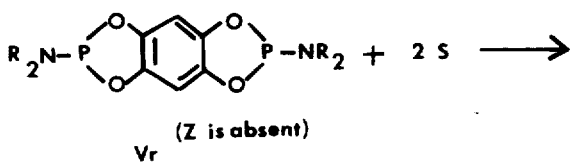 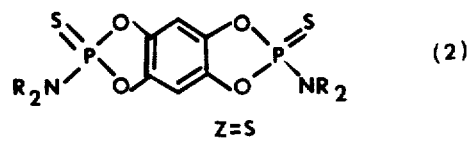

From Table VII (Example 12), it can be seen that the products prepared in this way (method C) were obtained in smaller yields and in lower purity than the bisthioamidates (VI, Z=S) prepared according to equation 1 (methods A and B).

EXAMPLE 1

THB (40 g), PCl₃ (400 ml) and water (1.6 ml) were placed in a vessel provided with a nitrogen gas inlet, a sealed stirrer and an effective cooler. The vessel was protected against moisture by CaCl₂-tubes and a slow stream of nitrogen was passed through the apparatus. The liquid was heated to the boiling point under stirring and refluxed for about 16 hours. After this period, the HCl evolution usually is complete. To the hazy solution Et₃N was added gradually at 70°C (between 1.7 and 3.4 ml) until the solution became clear with a precipitate formed. This liquid was decanted at 70°C and allowed to cool in a well closed flask to exclude moisture and air. The crystalline solid, the bischloridite (II) (85.5 g, 76 percent, mp 132°–144°C) was filtered off in a glovebox under dry nitrogen. A second crop was obtained from the filtrate upon further cooling (6.1 g, 8 percent, mp 124°–134°C). Upon recrystallization (from benzene) the mp rises to 141°–144°C.

EXAMPLE 2

In a three-necked flask, equipped with a nitrogen in-

EXAMPLE 3

TABLE I
Preparation of Bischloridite (II)

| Run | Procedure | Bischloridite (II) mp°C | Yield percent |
|---|---|---|---|
| 1 | As in Example 1 using 40 g (0.28 mole) THB (I), 628 g (400 ml, 4.56 moles) PCl₃ 1.6 g (89 mmoles) H₂O and 1.5 g (2.08 ml, 13.6 mmoles) Et₃N | 132–144 124–144 (note 1) | 76 8 |
| 2 | As in Example 1 using 59.5 g (0.42 mole) THB (I) 935 g (595 ml, 6.80 moles) PCl₃, 2.4 g (0.13 mole) H₂O and 2.95 g (4 ml, 27 mmoles) Et₃N | 130–134 126–133 | 69 8.8 |
| 3 | As in Example 2, using 9.3 g THB (I)—THF crystals 78.5 g (50 ml, 0.57 mole) PCl₃, 0.2 g (11 mmoles) H₂O and 2-3 drops Et₃N | 118–124 impure fraction | 84 21 |
| 4 | As in Example 2 using 69.5g THB (I)—THF crystals, 1.2g (0.07 mole) H₂O, 471 g (300 ml, 3.42 moles) PCl₃, 1 ml pyridine | white crystals | 85 |

(1)Recrystallization of samples from benzene raised the mp to 141–144°C.

EXAMPLE 4

In a two-necked 500 ml flask, provided with a gas inlet tube and a reflux condenser which carried a CaCl₂ tube, was placed 10 g (36.9 mmoles) bischloridite (II) and 360 ml CCl$_4$. After dissolution of the solid, the flask was cooled in an ice bath, the solution stirred magnetically and Cl$_2$ gas, dried over concentrated H$_2$SO$_4$, was bubbled through the solution until it escaped from the CaCl$_2$ tube. The ice bath was then removed and when the solution had warmed up to room temperature, dry N$_2$ gas was bubbled through the solution to blow out the Cl$_2$ gas left. Some precipitate was filtered off and to the filtrate was added 5.2 g (6.6 ml, 90 mmoles) acetone, which was dried before over Na$_2$SO$_4$. After standing overnight in a flask protected with a CaCl$_2$ tube, the bischloridate (IV) which had formed as a white precipitate was filtered off in a dry glove-box under nitrogen (9.5 g, 85 percent). It melted at 235°C (dec).

EXAMPLE 5

5 g (35 mmoles) THB and 18.3 g (87 mmoles) PCl$_5$ were brought together in a 500 ml three-necked flask provided with a N$_2$ gas inlet, a sealed mechanical stirrer and a reflux condenser protected with a CaCl$_2$ tube. To this mixture was added 200 ml CCl$_4$ whereupon a vigorous reaction started. When the reaction became less vigorous the mixture was refluxed for 4 days. A precipitate was filtered off at room temperature and to the filtrate was added 5.1 g (6.5 ml, 88 mmoles) acetone. After standing overnight the bischloridate (IV) (7.3 g, 69 percent) was filtered off as a slightly yellow precipitate.

EXAMPLE 6

TABLE II
Conversion of the Bischloridite (II) into the Bischloridate (V)

| Run | Procedure | Bischloridate (IV) mp°C | Yield percent |
|---|---|---|---|
| 5 | As in Example 4 using 2.4 g (5.1 mmoles) II, 45 ml CCl$_4$ and 1.2 g (20.7 mmoles) acetone | 235–242 (dec) | 63 |
| 6 | As in Example 4 using 10 g (36.9 mmoles) II, 360 ml CCl$_4$ and 5.2 g (90 mmoles) acetone | 235 (dec)[1] | 85 |
| 7 | As in Example 4 using 46 g (0.17 mole) II, 550 ml CCl$_4$ and 21.7g (0.38 mole) acetone | 210–215 (dec)[2] | 91 |

[1]The product is soluble in POCl$_3$ and in THF
[2]The product cannot be recrystallized from acetone.

EXAMPLE 7

TABLE III
Reaction of THB (I) with PCl$_5$

| Run | Procedure | Bischloridate (IV) | Yield percent |
|---|---|---|---|
| 8 | As in Example 5 using 5 g (35 mmoles) THB (I), 18.3 g (87 mmoles) PCl$_5$, 200 ml CCl$_4$, 5.1 g (6.5 ml, 88 mmoles) acetone[1]. | Slightly yellow solid | 69 |
| 9 | As in Example 5 using 20.1 g (0.24 mole) THB (I), 73.2 g (0.35 mole) PCl$_5$, 750 ml CCl$_4$, 20.3g 25.6 ml, 0.35 mole) acetone[1]. | White powder | 54 |

[1]Before the acetone was added the solution contained the bistrichloridate (III) as shown by the IR spectra.

EXAMPLE 8

Preparation of the Bisthiochloridate (V)

In a three-necked flask provided with a N$_2$ gas inlet, a sealed stirrer and a reflux condenser that carries a CaCl$_2$ tube at the top are mixed together 10 g (36.9 mmoles) bischloridite (II), 37.2 g (22.8 ml, 219 mmoles) PSCl$_3$ and 0.18 g (0.25 ml, 1.63 mmoles) Et$_3$N under nitrogen. The mixture is heated under reflux for 15 hours giving a clear brown solution and an oil that sticks on the walls of the flask. The hot solution is decanted from the oil and cooled in a refrigerator. The bisthiochloridate (V, 10.2–10.9 g, 82–88 percent) is obtained as a white to slightly yellowish crystalline compound of melting point 145°–160°C.

EXAMPLE 9

TABLE IV
Reaction of the Bischloridite (II) with PSCL$_3$

| Run | Procedure | Bisthiochloridate (V)mp°C | Yield percent |
|---|---|---|---|
| 10 | As in Example 8 using 10 g (36.9 mmoles) II, 37.2 g (219 mmoles) PSCl$_3$ and 0.18 g (1.63 mmoles) Et$_3$N | 145–160 | 82 |
| 11 | As in Example 8 using 23.9 g (88 mmoles) II, 89.6 g (529 mmoles) PSCl$_3$ and 0.43 g (4.27 mmoles) Et$_3$N | 137–155 | 88 |

EXAMPLE 10

TABLE V
Preparation of Bisamidites (VI, Z is absent)

| | Method of[1] Preparation | Yield (%) | Melting Point (°C) |
|---|---|---|---|
| NHCH$_3$ | A[2] | 62 | 140–141 |
| NHC$_2$H$_5$ | A[2] | 83 | 185–186 |
| NHC$_3$H$_7$ | A | 85 | 106–108 |
| NH-nC$_4$H$_9$ | A | 100 | (oil) |
| NH-tC$_4$H$_9$ | B | 87 | 158–160 |
| NH-nC$_6$H$_{13}$ | A | 62 | (oil) |
| NH-cyclo C$_6$H$_{11}$ | B | 63 | 160–162 |
| NH-nC$_{12}$H$_{25}$ | A | 85 | 90.5–91 |
| NHC$_6$H$_5$ | B | 83 | 152–154 |
| NH-pC$_6$H$_4$CH$_3$ | B | 96 | 164 |
| NH-pC$_6$H$_4$-nC$_{12}$H$_{25}$ | B | 100 | (oil) |
| N(CH$_3$)$_2$ | A[2] | 80 | 163–167 |
| N(C$_2$H$_5$)$_2$ | B | 90 | 123–124 |
| N(nC$_3$H$_7$)$_2$ | A | 92 | 89–91 |
| N(n-C$_4$H$_9$)$_2$ | A | 92 | 76–77 |
|  pyrrolidino | A | 64 | 160–230 (dec) |
|  piperidino | A | 83 | 182–184 |
|  morpholino | A | 45 | 194–197 |
| Primene 81-R[3] | B | 100 | (oil) |

[1]The amounts of amine per mole of bischloridite (II) are: Method A — 4 moles of amine R$_2$NH Method B — 2 moles of amine R$_2$NH, 2 moles Et$_3$N
[2]The reaction was carried out at 0°C
[3]Primene 81-R is a trade name for a tertiary alkyl primary amine, sold by Rohm and Haas Inc.

EXAMPLE 11

TABLE VI
Preparation of the Bisamidates (VI, Z=O)

| | Method of[1] Preparation | Yield (%) | Melting Point (°C) |
|---|---|---|---|
| $N(nC_3H_7)_2$ | A | 81 | 194–196 |
| $N(nC_4H_9)_2$ | B | 62 | 106 |
| $N(nC_{12}H_{25})_2$ | B | 88 | (oil) |
| $NHp-C_6H_4C_{12}H_{25}$ | B | 99 | (oil) |
| Primene 81-R[2] | B | 83 | 185–186 |

[1]The amounts of amine per mole of bischloridate (IV) are: Method Aa — 4 moles amine HNR$_2$ Method B — 2 moles amine HNR$_2$ 2 moles Et$_3$N
[2]Primene 81-R is a trade name for a tertiary alkyl primary amine, sold by Rohm and Haas.

EXAMPLE 12

TABLE VII
Preparation of the Bisthioamidates (VI, Z=S)

| | Method of[1] Preparation | Yield (%) | Melting Point (°C) |
|---|---|---|---|
| $NHCH_3$ | A[2] | 19 | 277–283 |
| $NHC_2H_5$ | A[2] | 85 | 220–222 |
| $NH-nC_3H_7$ | A | 90 | 172–175 |
| $NH-nC_4H_9$ | A | 100 | 151–154 |
| $NH-tC_4H_9$ | A | 69 | 253 (dec) |
| $NH-nC_6H_{13}$ | A | 100 | 104–106 |
| $NH-cyclo\ C_6H_{11}$ | A | 50 | 206–210 |
| $NH-nC_{12}H_{25}$ | B | 99 | 95–97 |
| $NHC_6H_5$ | A | 94 | 201–204 |
| $NH-pC_6H_4CH_3$ | A | 99 | 226–237 |
| $NH-pC_6H_4C_{12}H_{25}$ | B | 100 | (oil) |
| $N(CH_3)_2$ | A[2] | 51 | 281–284 |
| $N(C_2H_5)_2$ | A | 84 | 245–246 |
| $N(n-C_3H_7)_2$ | C | 86 | 174–185 |
| | A | 97 | 190–196 |
| $N(n-C_4H_9)_2$ | A | 83 | 96–100 |
| $N(cyclo-C_6H_{11})_2$ | A | 100 | 265–270 |
| $N(nC_{12}H_{25})_2$ | B | 26 | 69–71 |
| pyrrolidino | C | 50 | 225–247 |
| | A | 80 | 242–246 |
| piperidino | C | 42 | 210–260 |
| | A | 50 | 228–237 |

EXAMPLE 12-Continued

TABLE VII
Preparation of the Bisthioamidates (VI, Z=S)

| | Method of[1] Preparation | Yield (%) | Melting Point (°C) |
|---|---|---|---|
| 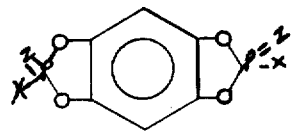 morpholino | A | 57 | 191 |
| Primene 81-R[3] | B[4] | 100 | (oil) |

[1]The amounts of amine per mole of bisthiochloridate V are: Method A — 4 moles amine R$_2$NH Method B — 2 moles amine R$_2$NH, 2 moles Et$_3$N In Method C the bisamidite (VI, Z is absent) is molten with two moles of sulfur at 150°C
[2]The reaction was carried out at 0°C
[3]Primene 81-R is a trade name for a tertiary alkyl primary amine, sold by Rohm and Haas, Inc.
[4]The reaction mixture had to be heated to the boiling point for 3 to 6 hours.

Representative compounds according to the invention were tested by the Navy Wear Test, the Rotary Bomb Oxidation Test, the Mean Hertz Load Test, the Rust Test and the Copper Strip Corrosion Test. The test data demonstrated load carrying and anti-oxidant properties for the compounds.

While the present invention has been illustrated mainly with reference to benzobisphospholes which are unsubstituted on the aromatic nucleus, it will be understood that the same is applicable also to analogous compounds having on this nucleus various non-interfering substituents such as alkyl, halogen, aryl, alkoxy, and alkylthio.

What is claimed is:

1. A compound of the formula:

wherein:
X represents pyrrolidino, piperidino or morpholino;
Z is oxygen, sulfur or is absent.

2. The compound according to claim 1 wherein Z is sulfur and X is pyrrolidino, piperidino or morpholino.

3. The compound according to claim 1 wherein Z is oxygen and X is pyrrolidino, piperidino or morpholino.

* * * * *